(12) United States Patent
Burkholder et al.

(10) Patent No.: US 6,228,528 B1
(45) Date of Patent: May 8, 2001

(54) PROTECTIVE ELECTROCHEMICAL CELL PACKAGE

(75) Inventors: Rick Burkholder; David Baggaley; Ernest Botos, all of Gainesville; Alexander Jacobs, III, Alachua, all of FL (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 09/217,716

(22) Filed: Dec. 21, 1998

(51) Int. Cl.$^7$ .................................................. H01M 2/00
(52) U.S. Cl. ........................ 429/163; 429/96; 429/99; 429/121; 429/122; 429/123; 429/149; 429/151; 429/153; 429/154
(58) Field of Search ............................ 429/96, 99, 121, 429/122, 123, 151, 149, 153, 154, 163

(56) References Cited

U.S. PATENT DOCUMENTS

| | | | |
|---|---|---|---|
| 4,002,287 | 1/1977 | Saveth | 229/23 AB |
| 5,375,709 | 12/1994 | Petro | 206/328 |
| 5,466,545 | * 11/1995 | Chamberlain et al. | 429/99 |
| 5,962,159 | * 10/1999 | Satou et al. | 429/99 |
| 5,976,720 | * 11/1999 | St. Jean et al. | 429/7 |
| 5,981,101 | 11/1999 | Stone | 429/100 |

FOREIGN PATENT DOCUMENTS

| | | | |
|---|---|---|---|
| 7602752 | 5/1976 | (DE) | B65D/1/18 |
| 3128840 | 2/1983 | (DE) | B65G/1/14 |
| 3226263 | 1/1984 | (DE) | B65G/1/14 |
| 4330352 | 3/1995 | (DE) | B65D/21/08 |
| 0579200 | 1/1994 | (EP) | B65D/6/02 |
| 9835880 | 8/1998 | (WO) | B65D/1/38 |

* cited by examiner

Primary Examiner—Stephen Kalafut
Assistant Examiner—Angela J Martin
(74) Attorney, Agent, or Firm—Linda Gebauer; Robert W. Welsh

(57) ABSTRACT

The invention pertains to housings and enclosures for assemblies of electrochemical cells such as used in consumer electronic devices. A system of structural elements having constant cross-section along at least one axis is provided to construct protective housings for electrochemical cell assemblies. Where cell assemblies include sensitive circuit elements such as circuit boards the fabricated housings include cover portions to reduce the chance of impact or contact damage to the circuit elements. By designing structural elements having open and constant cross-sections, a family of housing components may be fabricated from a single structural element by altering a length. Different configuration housings may also be constructed by rearranging the housing components or introducing additional interconnecting components. By incorporating a unified interconnecting element into each component, interchangeability is increased. In this way, the number of distinct housings that can be constructed from a limited number of distinct structural elements is increased. The invention includes cell assemblies incorporating such housing components. The invention provides inexpensive and easy methods of forming enclosures for a variety of cell assemblies by avoiding multiple toolings for unique parts.

6 Claims, 5 Drawing Sheets

PROTECTIVE ELECTROCHEMICAL CELL PACKAGE

BACKGROUND OF THE INVENTION

The present invention pertains to enclosures and housings for electrochemical cells and cell assemblies. More particularly it pertains to enclosures and housings for one or more small primary and secondary cells of the types which are often used in the form of a battery of one or more interconnected cells. Individual primary and secondary cells are manufactured in a limited number of standard configurations, each with generally fixed capabilities in available voltage, current and duration of output. However, the wide range of devices using these cells today have power demands that frequently exceed the capabilities of individual cells. Both primary and secondary electrochemical cells are combined in various ways to satisfy these demands. In one approach, the cells are introduced individually, loosely, to the powered device to be combined by the device's own internal circuit elements. Alternatively, the cells are bundled together to form an integrated battery pack.

Circuit elements can be incorporated with one or more cells to form an integrated battery pack. These circuit elements perform a number of functions, including the interconnection of the cells for battery packs having more than one cell, and the production of performance characteristics meeting the specified demand. These packs may be produced independent of the powered device and then inserted on demand as a unit. This type of integrated battery pack has become particularly favored as devices such as cellular phones and portable computers have increased demands on their batteries. The integrated battery pack also has increased convenience in the reduction of the number of parts handled by the user. As well, in the case of secondary cells, the packaged cell or cells may be more conveniently connected as a unit to a recharging device.

The introduction of high performance cell chemistries such as lithium ion based cells have added new demands on packaged cell assemblies. Lithium ion cells are preferably not used connected directly to the associated powered device. Rather, they are used in combination with protective circuit elements which protect against over-voltage or under-voltage on discharge or in cases of external shorting. Also "smart" battery circuit elements may be incorporated to provide control of the charge and discharge of the cell. These circuit elements are often themselves packaged on a circuit board which is assembled with one or more cells to form a battery assembly. The "smart" circuit elements can also monitor, for example, battery temperature and voltage for the purpose of enhancing operational life of the battery and avoiding cell failures resulting from unacceptable battery conditions. Therefore, their incorporation into the lithium ion battery pack is desirable. Rough handling, vibration or impact events can compromise the continued operation of these "smart" battery circuit elements and lead to unacceptable battery conditions. An external housing or enclosure which retains the individual cells as an assembly can also provide protection to protective and "smart" circuit elements. Enclosures such as shrink-wrapped plastic sleeves are often used to physically bundle cells together. But the nature of shrink-wrap materials does not lend them to protection of fragile elements such as circuit boards. Assemblies using shrink-wrap and similar coverings also generally cannot meet many industry standards such as those for flammability, and shock and vibration environments. Completely enclosing, rigid, plastic housings are often used to construct integrated battery packs for devices such as lap-top computers and cellular phones. Although these customized structures can provide a high level of protection and function, they generally incur high production costs. This is due to their relatively complex shapes requiring the use of production processes such as injection molding having significant initial tooling expenses. As well as being costly, these processes generally have a long lead time to produce a finished product. This is not conducive to consumer battery production which must respond quickly to changing product demand. Particularly in the circumstance of demands for small lot production, customized high initial cost enclosure structures are often not feasible.

What is needed is a method of easily and cheaply producing protective enclosures for cell assemblies incorporating circuit elements. Such enclosures should be easily adaptable to a variety of cell configurations and sizes and should not require customized tooling.

SUMMARY OF THE INVENTION

The problem of providing an adaptable battery housing is resolved in the present invention by a system of simple structural shapes which may be easily modified and combined to create a family of differently sized and shaped housing structures.

An object of the present invention is a cell assembly including a housing formed by a structural element having a constant cross-section axis.

A second object of the present invention is a method of fabricating cell assembly housings in which simple structural shapes are combined; the shapes each have a longitudinal axis along which a cross section is unchanging.

Another object of the present invention is a system of structural elements for the construction of a family of cell assembly housings. The elements in the system each have at least one axis along which an element cross-section is unchanging.

Systems of structural elements are defined which have structural features which interconnect in a number of ways to form a variety of distinct enclosure bodies. These elements are relatively rigid and have portions which provide covering and support for attached cell assemblies including fragile circuit elements. One feature of the structural elements of the present invention is a constant cross-section axis. Each element has at least one linear axis along which the element's orthogonal cross-section is essentially constant. Such elements are cut or otherwise altered in length to form a variety of distinct housing or enclosure components.

In one embodiment, a structural element is designed to enable forming multiple housing components which may be combined in more than one alternative configuration to form multiple enclosures. To enable these multiple combinations, the structural element is preferably "open"—having a cross section with terminal ends or arms and not defining a closed or limited cavity or internal space. Such open structures can potentially be oriented and combined in a multiple of ways. In one example of an open structural element, a "J" shaped structure is provided. Arms of the "J" shape include interconnecting elements which allow the housing components to be combined in alternative configurations depending upon the configuration cell assembly to be protected. Other forms of interconnecting elements are provided and are available for various embodiments. The "J" shape has an open cavity (defined by the two arms) which is sized to receive a predetermined cell configuration dimension, such as the diameter of one or more cylindrical cells, or the width of one or more prismatic cells. In similar fashion, other cross sections may have open cavities sized to constrain one or more cell dimensions. Systems of structural elements according to the present invention may include one or more distinct structural elements. Alternative embodiments include structural elements having a "C" shaped cross-section.

In a further embodiment, various housings are formed by providing an end structural element and a side structural element. Housings are constructed by combining two end components and pairs of side components formed from these structural elements. The number of pairs of side components or the length of the components can be altered to accommodate varying numbers of cells in an assembly. The present invention includes methods of fabricating enclosures from structural elements designed to have the above features.

The novel aspects of the claimed invention are best understood with respect to the examples and details provided in the following discussion and drawings.

DESCRIPTION OF THE DRAWINGS

FIG. 1A depicts the structural element. FIG. 1B is an exploded view of the components while

DESCRIPTION OF THE PREFERRED EMBODIMENTS

In the present invention, housings for cell assemblies are constructed from simple structural shapes. The housings may be "open" or "closed" as described below. In order to gain the maximum flexibility at the lowest cost, structural elements having a constant cross-section axis are used. By "constant cross-section axis" it is meant that in an element there is at least one direction or axis along which the orthogonal cross-section of the element is effectively unchanging. A significant benefit of this type of structural shape is the ease and speed with which it can be fabricated. Unit castings, such as injection moldings, must typically be used to fabricate more complex three-dimensional elements. Using any of a variety of plastics appropriate for cell assembly housings, constant cross-section elements may be fabricated by extrusion processes. The continuously formed extruded elements may be cut to a required length to form the components of a cell assembly housing. To enable constructing a maximum of different housing configurations from a limited number of different structural elements, each structural element cross-section is preferably also open, providing leg or arm portions which can be interconnected in a multiple of configurations. This is assisted by incorporating interconnecting structural features. These features allow portions of the same shape, and portions of different shapes, to interconnect or be mutually connected, in a variety of ways. These structures are explained in accompanying figures and in the discussion below.

Figure 1A:
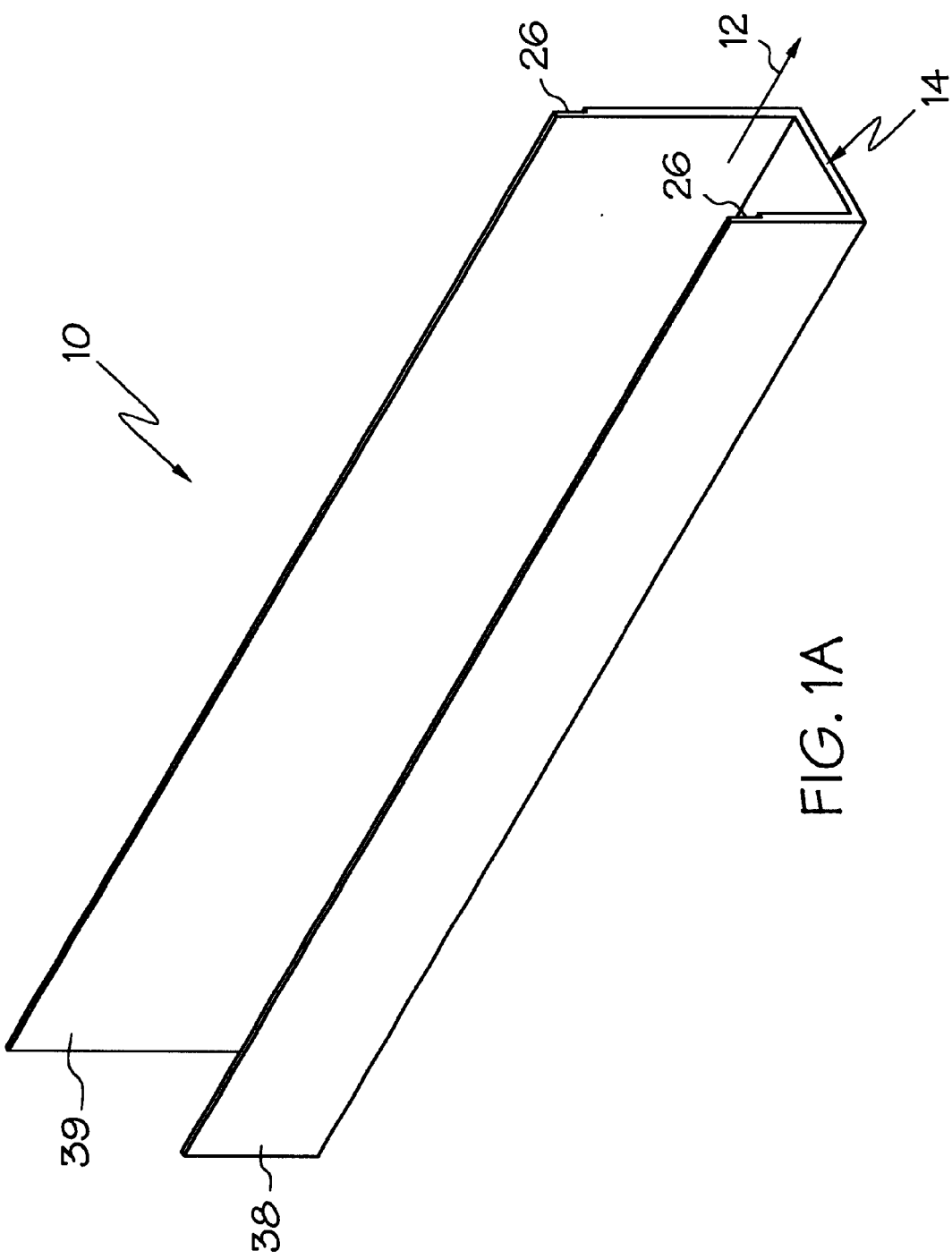
FIGS. 1A,B,C depict one embodiment of the present invention in which "J" shaped housing components form an open enclosure body about a cell assembly.
Figure 1B:
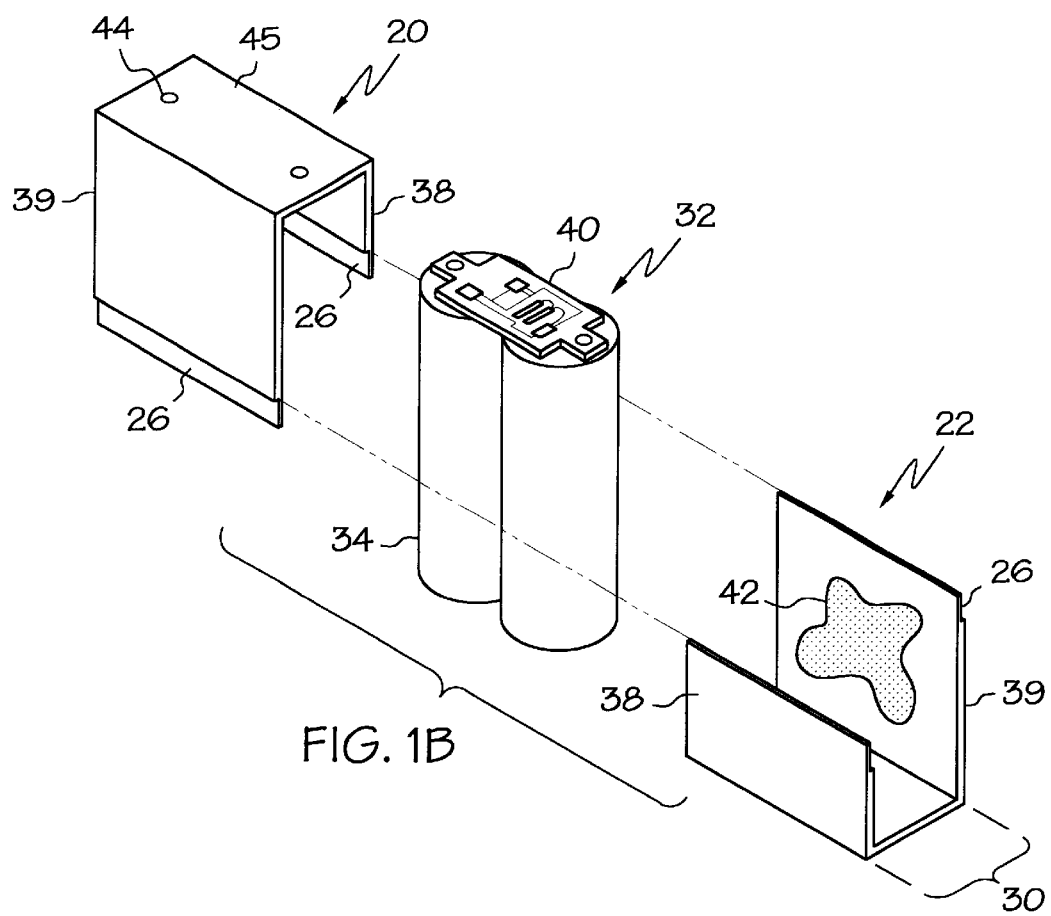
Figure 1C:
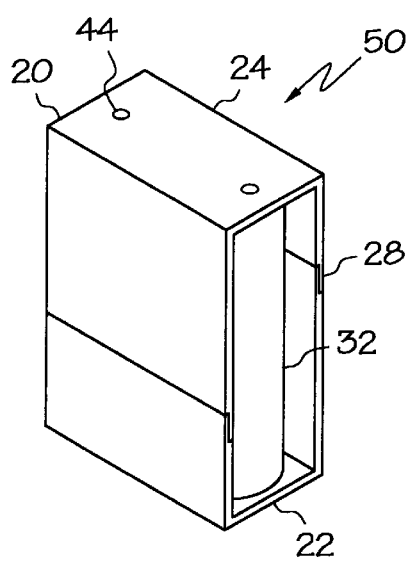
FIG. 1C depicts the completed cell package.

FIGS. 1 and 2 depict various cell assembly housings constructed from a structural element having constant cross-section. FIG. 1A depicts a "J" shaped structural element 10 having a longitudinal axis 12. Along the axis 12 a cross-section 14 of the "J" shape 10 is effectively constant. This cross-section is also "open" in that there are terminal ends without an enclosed cavity or space defined by the cross-section. This allows for the desired interconnectivity and maximized adaptability to a variety of configurations. The structural element 10 is easily fabricated by well known extrusion processes. FIG. 1B and C depict how housing components 20 and 22, which are cut lengths of the structural element 10, are combined to construct a cell assembly housing 24. Interconnection elements as thinned lap sections 26 are formed in the structural element 10. The lap sections 26 are arranged on the structural element 10 so that when the housing components are assembled as shown in FIG. 1B, the lap sections will combine to form lap joints 28. The structural element has a internal cavity width 30 sized to accept a cell assembly 32 of cells 34 having a predetermined diameter. The combined diameters of the two cells 34 determine the required length of the two housing components 20 and 22. Two arms 38 and 39 of the structural element 10 have lengths which in combination give the housing 24 a height sufficient to accept the cell assembly including circuit elements in the form of an attached printed circuit board 40. A securing mechanism is provided in this embodiment by an adhesive 42 on the inside of the housing to which the cell assembly 32 is secured. Access holes 44 are introduced to a cover portion 45 of the housing 24 to expose electrical contacts on the circuit board 40. A covering structure of some form, such as the cover portion 45, is essential in all embodiments to provide protection to the circuit elements. In this embodiment the housing 24 is open in that the cell assembly is not completely isolated from the surrounding environment. The housing 24 provides rigidity to the cell assembly and protects the circuit board 40 from accidental contact or contamination from the surroundings. This packaged battery pack 50 may be more safely handled, transported and inserted into a powered device. In this embodiment the housing components 20,22 are just long enough to capture the cell assembly 24. In other embodiments, other lengths of the same structural element 10 may be cut to satisfy other requirements.

Figures 2A, 2B:
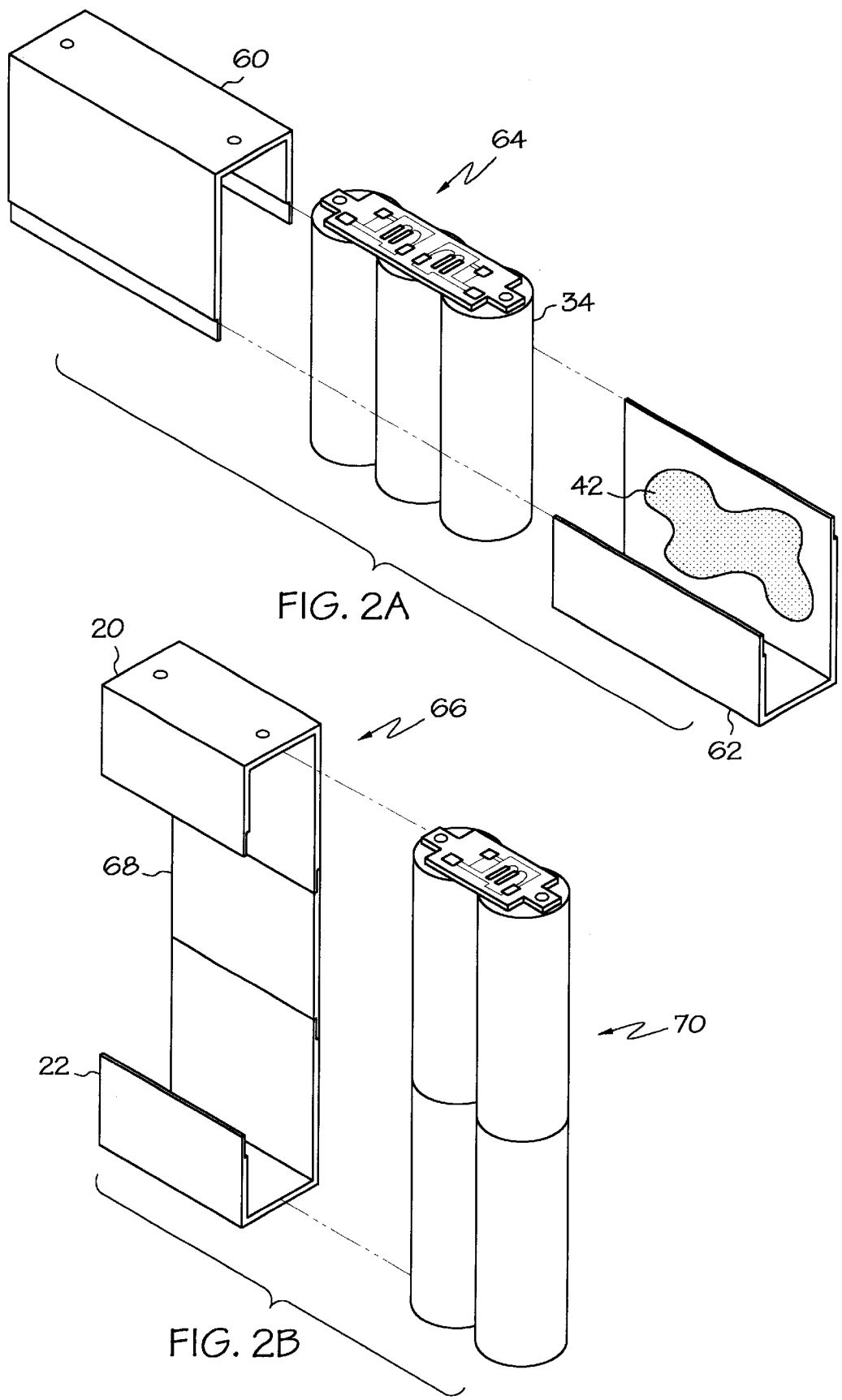
FIGS. 2A,B depict the housing components from FIG. 1a adapted to accommodate a larger number of cells. The structures for extending width and length of the enclosure is shown.

In FIG. 2A housing elements 60, 62 are cut to extended lengths in order to enclose a second cell assembly 64 having three cells 34. The housing elements 60, 62 may be assembled in exactly the same manner as above. In other configurations, additional cell assemblies having more than three cells may be enclosed by housing elements cut to yet greater lengths. All of these configurations make up a family of housings which may be constructed from the same structural element 10.

In FIG. 2B, the housing components 20, 22 of FIG. 1B are combined to construct an elongated housing 66. An additional intermediate housing component 68 is interposed between housing components 20 and 22 to elongate a dimension of the housing 66 and accommodate a third cell assembly 70 having four cells. The intermediate housing component 68 is cut from a second structural element also having constant cross-section. In other configurations, a wide range of cell assemblies may be housed using different housing components cut from these structural elements. The structural elements are preferably designed to provide interconnecting elements which can easily be combined in a variety of ways. The thinned lap sections 26 shown in the figures is but one example. Alternatively, the components may be retained in position by external means such as a surrounding shrink-wrap covering. By introducing additional intermediate housing components, a yet wider range of combinations are produced. Again, these preferably include complementing interconnecting elements. Preferably, all of the components have a constant cross-section axis. In other embodiments, the above housing components are combined with secondary components which do not have a constant cross-section axis. To the extent that housing components with a constant cross-section axis are used, the advantages of the present inventive concepts are more easily obtainable.

The lap joints 28 of the above housings are preferably fused or bonded together to form a rigid structure. The method of securing the lap joints 28, or alternative interconnections, depends somewhat on the component materials. These may include ultrasonic welding, resistance welding, solvent welding and adhesives. Appropriate methods will be known to those skilled in the fabrication of these types of structures.

In the above configurations, the flexibility of use of the structural element is somewhat limited by the nature of the "J" shaped cross-section. The internal cavity width 30 is fixed for a particular cell assembly configuration. Other shapes are not so limiting. A structural element having a constant "L" shaped cross-section is also used (not shown). By eliminating one of the two arms 38, 39 of the above housing components 20, 22 an "L" shaped cross section is created which may also be used to form open or closed housings. This shape may be used as a single housing component or combined similarly as shown in the figures. Used singly, a single "L" shaped housing component can alternatively provide a covering portion over a range of cell diameters.

Figure 3A:
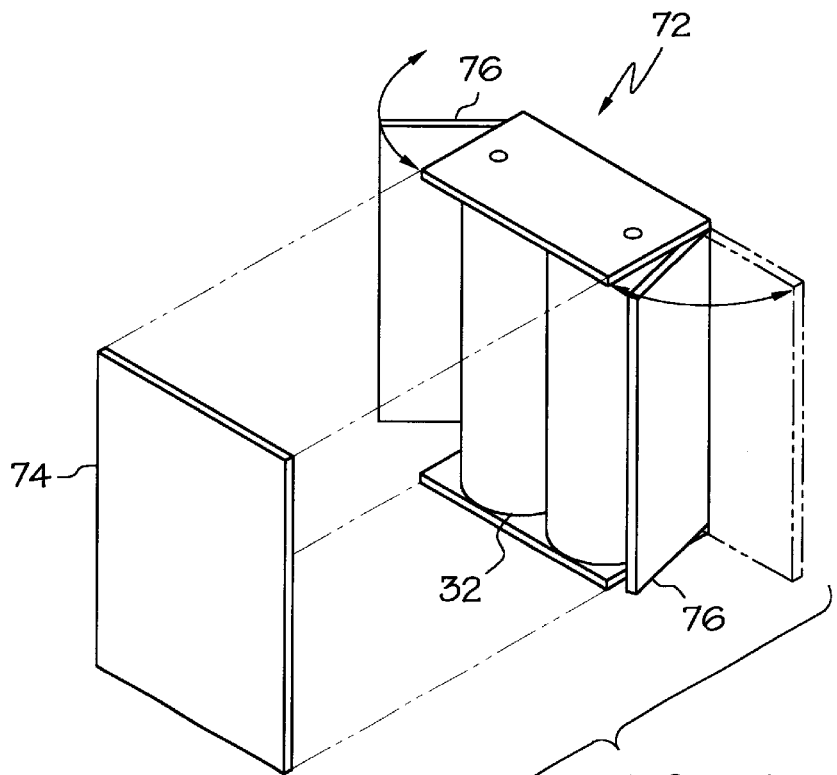
FIG. 3A depicts how an extruded structural element having a "C" cross-section is cut and bent to form a closed housing.
Figure 3B:
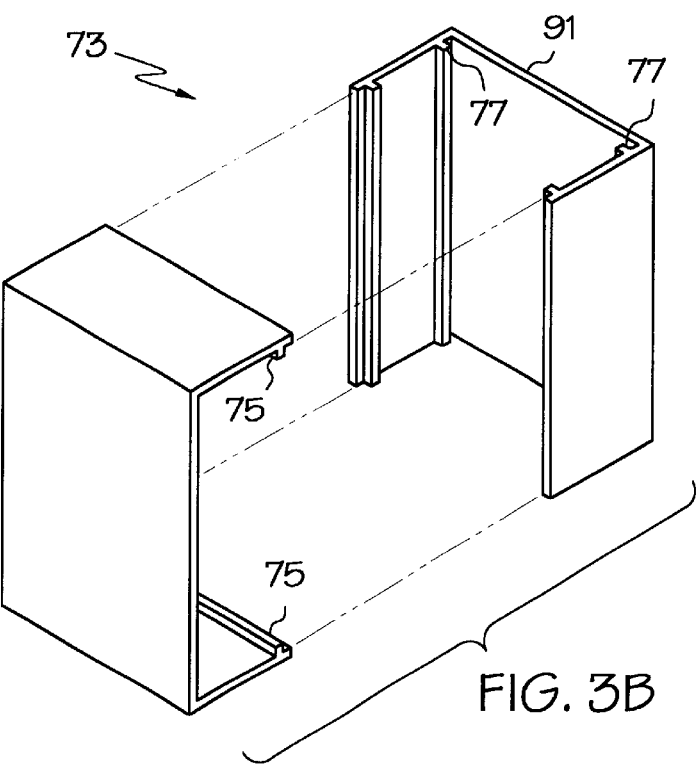
FIG. 3B is an alternative closed housing constructed from "C" cross-section components.

FIGS. 3A and B depict housing components constructed from "C" cross-section structural elements. In FIG. 3A a "C" cross-section structural element is cut and bent to form the housing component 72 which mates with a flat plate 74 to construct a closed housing. Portions of the section's flanges are cut away leaving leg portions 76 which are bent to form a box to which the plate 74 is secured. Bending of some plastic housing components may be eased by heat application. Methods are well known. A cell assembly 32 is captured within the closed housing. The flat plate 74 is also of constant cross-section. In this embodiment, other configurations to accommodate larger cell assemblies (more cells in a single row) are constructed by increasing the width of the housing component 72. In FIG. 3B a mating pair 73 of distinct "C" cross-section housing components include interconnecting elements in the form of longitudinal ribs or teeth 75, 77. A first rib 75 of the first housing component is sized and positioned to interlock between the second rib 77 and the back wall 91 of the second housing component. The pair of components 73 snap together around an associated cell assembly to form a closed housing. The mating edges may be glued or bonded. Note, that in this example the housing is "closed" while the originating structural element is "open". Due to the necessarily interrelating dimensions, this embodiment does not have the adaptability of some of the other embodiments of the invention.

Figure 4A:
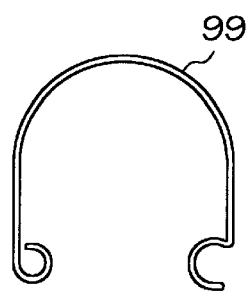
FIGS. 4A–D depict various enclosure elements used to form enclosure bodies having interlocking sections for expanding the width of the enclosure body.
Figure 4B:
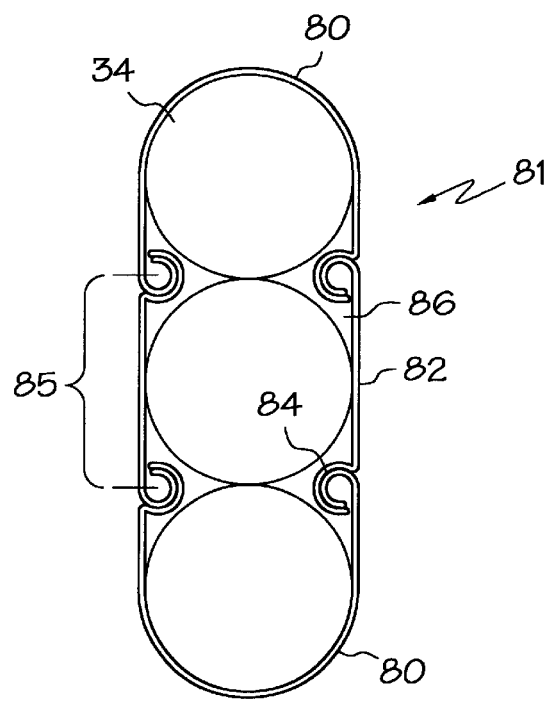
Figure 4C:
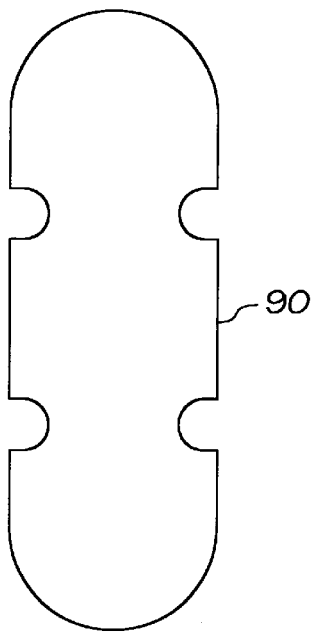
Figure 4D:
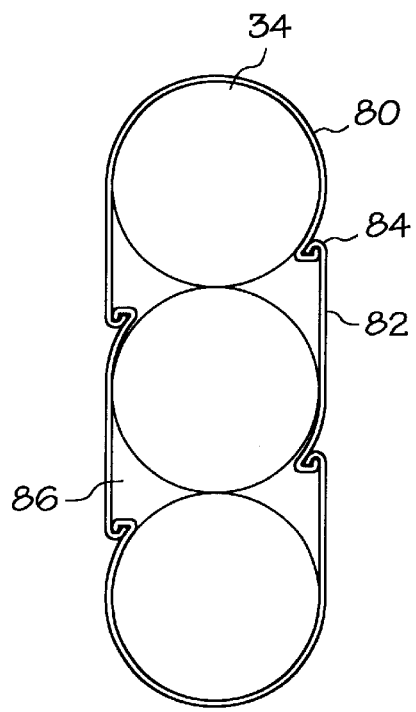

FIGS. 4A to D depict various enclosure elements used to form enclosure bodies having interlocking sections for expanding the width of the enclosure body. All figures are cross-section views. FIG. 4A shows the constant cross-section of the structural element 99 from which are cut both end components 80 of the enclosure 81 of FIG. 4B. Side components 82 attach to the end components 80 by means of snap joint structures 84. The end component structural element 99 has an internal cavity shaped and sized to receive a cell 34 of a predetermined diameter. The side components 82 are shaped and sized and have a unit length 85 to interconnect with the end component 80 to form an unit cavity 86 capable of receiving an additional cell. The mating snap joint structures are designed such that each side component 82 may interconnect with additional side components or with end components 80. To expand the configuration shown in FIG. 4B to receive a cell assembly having four cells, an additional pair of side components are added between the existing side components 82 and the end components 80. In this manner the depicted family of parts derived from a system of only two structural elements (ends and sides) can be combined to form a multitude of enclosures. Various means of providing covering portions or caps to these enclosure are possible. FIG. 4C depicts an end cap 90 shaped to specifically cover the configuration of FIG. 4B. Preferably, the side components 82 and end components 80 have an axial length sufficient to receive the length of a cell assembly including circuit elements. However, shortened components are used in alternative configurations providing a cover portion to only one end of the cell assembly. The snap joint structures 84 may take many alternative forms. One alternative is shown in FIG. 4D. Many slip or interlocking structures known for interconnecting parts may also be successfully used. To incorporate these alternatives will be obvious to one skilled in making such structures. After partial or full assembly of the enclosure components, fusing of the snap joints and other joints are completed to increase rigidity of the enclosure.

The structures shown in the above examples may be fabricated from a variety of materials. In selection of materials, safety standards for the particular cells and use should be considered. Due to low cost and ease of fabrication, plastics are preferred, particularly those which are formable by extrusion processes. While it is preferred that structural elements and components be formed by extrusion processes, other shaping and forming processes may be used. For example, many of the example components may be formed from sheet metal by bending processes. However, the benefits of the concept of the constant cross-section structural elements may be greatest with extruded parts. In the above examples, the housing and enclosure elements are described as being "cut" from larger structural elements. "Cut" is intended here as meaning any process by which a component may be formed from a larger structural element. In practice, the concept of the constant cross-section structural element can reduce to a minimum the cutting operations required to complete a specific housing.

By using the concept of combining components formed from constant cross-section structural elements, efficient methods of producing cell assembly housings are possible. In one implementation of the present invention, a system of structural elements are provided. The system includes multiple structural elements and/or housing components which are combinable in a variety of ways. A characteristic of such a system is that the number of housing configurations constructable by varying system parameters (such as length) is greater than the number of unique structural elements in the system. One such system includes structural elements such as shown in FIG. 1A together with other structural elements having mating interconnecting means. The elongated structural elements are then cut on demand to determined lengths as required to construct housings sized for various cell assemblies. In this manner, structural elements may be fabricated before the specific cell assembly to be housed is known. Where the structural elements all include a cavity width or other limiting dimension, the system may be limited to constructing housings for a specific set of cell assemblies, such as cell assemblies including only a specific diameter cell. A system may consist of a single constant cross-section structural element.

The preceding discussion is provided to illustrate the present invention by example. Other variations of the claimed inventive concepts will be obvious to those skilled in the art. Adaptation or incorporation of known alternative devices and materials, present and future is also contemplated. The intended scope of the invention is defined by the following claims.

We claim:

1. A simplified packaged electrochemical cell assembly incorporating a protective covering, the packaged assembly comprising;

at least one cell;

at least one circuit element functionally connected to the at least one cell; and an enclosure consisting essentially of at least two enclosure components each component having a longitudinal axis and an open cross-section, the cross-section being substantially unchanging along the axis and identical for each such component when each such component is unassembled, and each component being effectively rigid and extruded;

the cell being disposed within the enclosure.

2. The assembly of claim 1, wherein:

one of the at least two components has a cover portion effectively covering the circuit element.

3. The assembly of claim 2, wherein:

the cross-section is substantially "J" shaped.

4. The assembly of claim 2, wherein:

the cross-section is substantially "C" shaped.

5. The assembly of claim 3, wherein the enclosure is closed.

6. The assembly of claim 4, wherein the enclosure is closed.

* * * * *